(12) United States Patent
Ramamoorthy et al.

(10) Patent No.: US 8,484,298 B2
(45) Date of Patent: Jul. 9, 2013

(54) METHOD AND SYSTEM FOR SIP BASED DYNAMIC ADVERTISEMENT OF PRESENCE INFORMATION

(75) Inventors: Arunprasath Ramamoorthy, Bangalore (IN); Venkateswar Jeedigunta, Bangalore (IN); Jae-Kwon Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 645 days.

(21) Appl. No.: 12/673,339

(22) PCT Filed: Aug. 14, 2008

(86) PCT No.: PCT/KR2008/004748
§ 371 (c)(1),
(2), (4) Date: Feb. 12, 2010

(87) PCT Pub. No.: WO2009/022875
PCT Pub. Date: Feb. 19, 2009

(65) Prior Publication Data
US 2011/0202607 A1  Aug. 18, 2011

(30) Foreign Application Priority Data
Aug. 14, 2007 (IN) .......................... 1811/CHE/2007

(51) Int. Cl.
*G06F 15/16* (2006.01)
(52) U.S. Cl.
USPC ............ 709/206; 709/203; 709/217; 709/224
(58) Field of Classification Search
USPC .......................... 709/203, 206, 217, 224, 230
See application file for complete search history.

(56) References Cited

U.S. PATENT DOCUMENTS

| | | | |
|---|---|---|---|
| 2002/0075304 A1* | 6/2002 | Thompson et al. | 345/751 |
| 2002/0184089 A1 | 12/2002 | Tsou et al. | |
| 2003/0065788 A1 | 4/2003 | Salomaki | |
| 2004/0177134 A1 | 9/2004 | Lonnfors et al. | |
| 2004/0193920 A1* | 9/2004 | Kiss et al. | 713/201 |

(Continued)

FOREIGN PATENT DOCUMENTS

| | | |
|---|---|---|
| JP | 2003-076690 | 3/2003 |
| WO | WO 2007/066989 | 6/2007 |

OTHER PUBLICATIONS

Camarillo et al., "Refering to Multiple Resources in the Session Initiation Protocol (SIP)", draft-ietf-sipping-multiple-refer-00.txt, Sipping Working Group, Jul. 7, 2004.

*Primary Examiner* — Ramy M Osman
(74) *Attorney, Agent, or Firm* — The Farrell Law Firm, P.C.

(57) ABSTRACT

A method and system for dynamic advertisement of presence information using SIP is disclosed. In one embodiment, a method for dynamic advertisement of presence information includes initiation of the presence invitation message by presence inviter which can be of XML format, distribution of presence invitation message by presence invitation distributor from presence inviter to presence invitee and acceptance of the presence invitation message by presence invitee including subscribing as per the invitation, which provides information to the presence invitees about newly available parts of presence information, through SIP REFER or SIP MESSAGE methods. In another embodiment of the present invention includes a method for sending the presence invitation message directly to a single presence invitee. In yet another embodiment of the present invention includes a method for sending the presence invitation message to multiple presence invitees in a URI-list through RLS and XDMS.

20 Claims, 5 Drawing Sheets

U.S. PATENT DOCUMENTS

| | | |
|---|---|---|
| 2006/0183467 A1 | 8/2006 | Stewart |
| 2006/0248185 A1 | 11/2006 | Morris |
| 2007/0036143 A1* | 2/2007 | Alt et al. ............... 370/352 |
| 2007/0100831 A1 | 5/2007 | Cox |
| 2008/0077696 A1* | 3/2008 | Nguyen et al. .......... 709/229 |
| 2008/0288649 A1* | 11/2008 | Burckart et al. ......... 709/230 |
| 2008/0313323 A1* | 12/2008 | Morris ..................... 709/224 |
| 2009/0023399 A1* | 1/2009 | Lindgren et al. ........ 455/90.2 |
| 2009/0043627 A1* | 2/2009 | Vaidya et al. ............... 705/8 |

* cited by examiner

METHOD AND SYSTEM FOR SIP BASED DYNAMIC ADVERTISEMENT OF PRESENCE INFORMATION

TECHNICAL FIELD

The present invention, in general, relates to presence based interactive communications systems. Particularly, the present invention relates to a method for SIP (Session Initiation Protocol) based dynamic advertisement of presence information as defined by OMA.

BACKGROUND ART

In computer and telecommunications networks, presence information is a status indicator that conveys ability and willingness of a potential communication partner, for example a user, to communicate. A user's client provides presence information (presence state) via a network connection to a presence service, which is stored in what constitutes his/her personal availability record (called a presentity) and can be made available for distribution to other users (called watchers) to convey his/her availability for communication. Presence information has wide application in many communication services and is one of the innovations driving the popularity of instant messaging or recent implementations of voice over IP (VoIP) clients in the present day telecommunication scenario.

The presence service is a service that enables the collection of communication related information of a person, followed by the dissemination of the collected information of the person of interest to other persons. Presence based interactive communication services facilitate more efficient and effective communication sessions by enabling presentities to publish in real time, their presence information (such as, the availability, activity, local time, location, current status of the active devices/applications, etc.), and their preference information (e.g., device preferences) to presence watchers. The presence and preference information improves the efficiency of establishing various types of communication sessions, such as voice, text and multi-media communication.

FIG. 1 illustrates the basic architecture of existing art of presence service. The target person of interest in the presence service is called as presentity and the communication related information is called as presence information. Each presence source collects its view of the presentity's presence information, and then delivers it to the presence server using SIP PUBLISH, a method used for publishing event state information such as presence event and reg. events as defined in RFC3903 "Session Initiation Protocol (SIP) Extension for Event State Publication", A. Niemi, October 2004. The presence server composes the presentity's presence information from presence sources and delivers the aggregated presence information of the presentity to the persons who have requested for the same. The persons who have interests of the presentity's presence information are called watchers and they use the presence event subscription and notification for the requests and delivery of the presentity's presence information, according to RFC3856 "A Presence Event Package for the Session Initiation Protocol (SIP)", J. Rosenberg, August 2004. When a watcher subscribes to presence event package for the presence information of a presentity, he/she can also include in the subscription request the event notification filter as per RFC4660 "Functional Description of Event Notification Filtering", H. Khartabil, et al. September 2006, such that he/she can receive only the interested part of the presence information, and not the entire chunk. Upon receiving this presence subscription request from the watcher, the presence server authorizes the request to decide whether the presentity allows the watcher to subscribe his/her presence information and if allows, what parts of the presence information is allowed to be disseminated and sent to the watcher. Upon successful authorization, the presence server delivers the authorized parts of the presence information of the presentity to the watcher using the presence event notification.

In the state of the art literature, the US published patent application titled "System and method for utilizing a presence service to advertise activity availability" describes a system and method for advertising over a network an invitation to engage in at least one activity is described. In one embodiment, a presence service on the network receives from an inviting presence client activity information related to at least one activity the inviting presence client is interested in participating. The presence service then updates a tuple associated with the inviting presence client to include the information related to the activity, and sends the invitation to engage in the activity to at least one other presence client on the network.

In short, the above-mentioned prior art literature describes a system and method for advertising an activity to presence clients over a network. A first presence client sends activity information to the presence service on the network. The presence service then updates a tuple associated with the first presence client to include the activity information. The presence service then sends an invitation to other presence clients on the network. Other presence clients can subscribe to the activity upon receiving the invitation. That is, the patent application describes a presence client sharing its current or future availability status to other presence clients. However, it does not explicitly mention sending of any advertisements about newly added presence information by the presentity.

DISCLOSURE

Technical Problem

From the foregoing, it is obvious that at present, there exists no technology in the known art by which the presentity could advertise to the watchers about the availability of new updates in the presence information, or invite potential watchers to subscribe to the presence information, which might be useful to them. Based on these premises, the current invention is presented herein.

Technical Solution

The present invention proposes a method for dynamic advertising of presence information, wherein the presentity can use this method to inform the watchers about the newly available parts or any new updations made to the presence information, or give the potential watchers an option to subscribe to the presence information, as a whole or selectively in parts, if they are interested.

It is therefore the primary object of the present invention to propose a method and system for dynamic advertisement of presence information using SIP.

It is another object of the invention to let a watcher subscribe to select parts of the presence information.

It is yet another object of the invention to let a presentity send the presence invitation message directly to a single presence invitee, or selected few only.

Accordingly, the present invention proposes a method for dynamic advertising of presence information, wherein a presentity can use the said method to inform its watchers about the newly available parts or any new updations made to the presence information, or give the potential watchers an option to subscribe to the presence information, as a whole or selectively in parts, the method comprising, Initiating the presence invitation message by the presence inviter;

Distributing the presence invitation message from the presence inviter to presence invitee, by the presence invitation distributor; and Accepting the presence invitation message by the presence invitee.

These and other objects, features and advantages of the present invention will become more apparent from the ensuing detailed description of the invention taken in conjunction with the accompanying drawings.

DESCRIPTION OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

BEST MODE

The preferred embodiments of the present invention will now be explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

The present invention proposes a method and system for dynamic advertisement of presence information through which, the presentity can inform the watchers regarding newly available parts of the presence information. Further, the presentity can invite the potential watchers to subscribe to the presence information of the presentity. As per the present invention, watchers will have the option to subscribe to the presence information if he/she find interesting.

The instantiation of presentity can be of systems like transport system, health care system, reservation system etc. The information that each presence source provides would be entirely different. In one exemplary embodiment, the invention proposes to use a mechanism which can be standardized to achieve the functionality of dynamic advertisement of presence information, which enables the presentity to invite potential watchers to the presentity's presence information, and also enables the presentity to inform the existing watchers about the newly available presence information for which the watchers can subscribe.

It is appreciated that in order to achieve dynamic advertisement of presence information, a presence invitation message can be used for presentity's invitation to his/her presence information.

Figure 1:
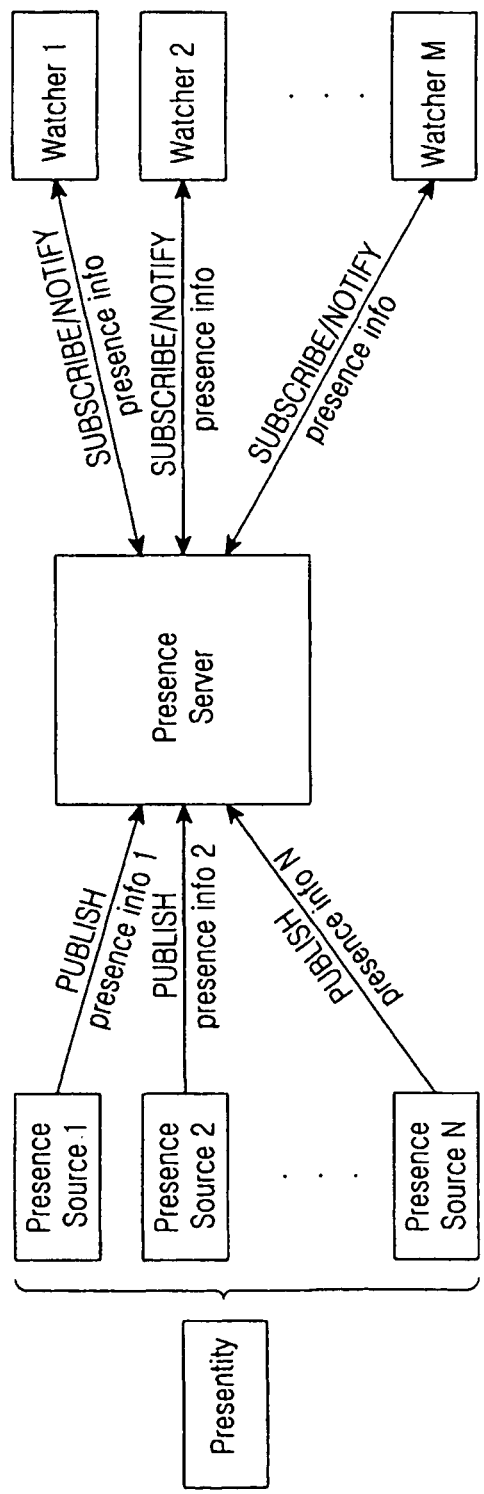
FIG. 1 illustrates the basic architecture of existing art of presence service
Figure 2:
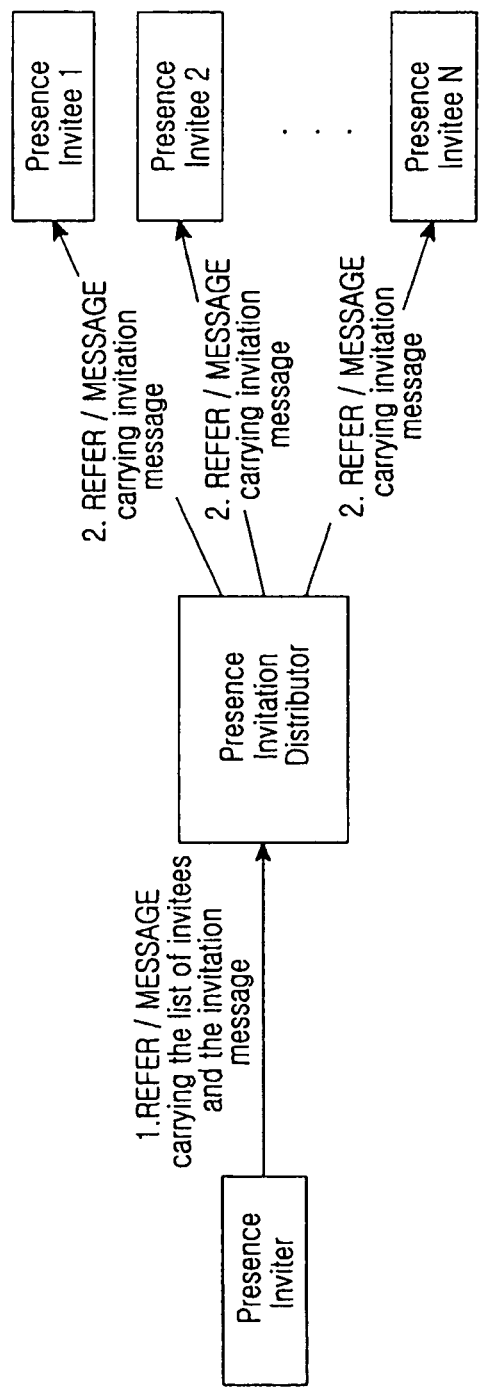
FIG. 2 illustrates the exemplary communication system for presence invitation message

FIG. 2 illustrates the exemplary communication system for presence invitation message. The present invention proposes the three functional entities namely, presence inviter, which generates the presence invitation message; presence invitation distributor, which distributes the presence invitation message to the list of invitees that the presentity wants to invite; and the presence invitee, who receives the presence invitation message and can make the subscription to the presence inviter's presence information upon the acceptance of the presence invitation.

In another embodiment of the present invention, the dynamic advertisement of presence information is achieved by initiation of the presence invitation message by the presence inviter to the presence invitation distributor. The presence invitation message can include the list of invitees and the invitation message. The presence invitation message can be invoked using SIP REFER request. Further, the presence invitation message can be distributed to the invitees by the presence invitation distributor. The presence invitation message can be distributed again using the SIP REFER request. Here it is to be noted that, if the presence invitation message is invoked using the SIP REFER request, then it should also be distributed using the same method of SIP REFER request. Later, the presence invitation message sent to the invitees can be accepted and subscription to the presence inviter's presence information as per the invitation can be achieved.

In another exemplary embodiment of the present invention, the presence invitation message can be initiated as follows: presentity is the only entities who can decide of when to invite invitees to his/her own presence information, the content of presence invitation message, and to which invitees the invitation should be sent. Once the presentity decides to send presence invitation message to invitees, the presence inviter of the presentity takes up the responsibility to compose the presence message invitation as per the presentity's request and then transmits it to the network for its distribution to the designated presence invitees. Since, it is the presentity who decides the need for the presence invitation message; the presence information generator can be mostly sit in the presentity's user equipment (UE).

Accordingly, the presence invitation message should contain the enough information with which the invitee, who receives the invitation, can be able to make the presence subscription request. Therefore, the content of the presence invitation message can include at least few contents namely, the address of record (AOR) of the presentity invoking the presence invitation message, which allows the invitee to generate the presence subscription request to the mentioned AOR, and the contents of presence information of which availability the presentity wants to inform, so that the invitee can generate the presence subscription request for the respective contents. The presence invitee can be either the current watchers for the presentity's presence information or the potential watchers who do not have subscription to the presentity's presence information yet, but might subscribe for the presentity's presence information later.

The presence invitation message composed by the presence inviter upon presentity's request can be in XML format as shown in Table 1. In order to include the above listed contents in the presence invitation message, the presence invitation message document begins with the presence-invitation root element. The presence-invitation root element can be associated with a presence-inviter attribute, which carries the AOR (Address of Record) of the presentity, who initiates the presence Invitation. The presence-invitation root element can contain zero or one invited-presence-contents-list. The invited-presence-contents-list element carries the lists of the parts of presentity's presence information for which the recipient of the presence invitation message can subscribe for. The contents of the invited-presence-contents-list element tag can vary at the discretion of the presentity. The format of the contents of the invited-presence-contents-list child element can be anything that can represent the parts of the presence information. A possible way to express such contents would be following the description of "Presence Authorization Rules per draft-ietf-simple-presence-rules", J. Rosenberg, where the parts of the contents to be authorized are represented by the unit of presence information element, e.g., <geopriv>, <activities>, <mood> etc. It is also possible that the presence-invitation root element cannot have any child element. More precisely, this is used when the presentity wants to simply invite the present invitees without the hint of the invited parts of the presentity's presence information.

Additionally, the presentity must make sure that the presence invitees and the invited parts of the presentity's presence information should be aligned with the presence authorization rule, such that, when the presence invitees make subscription to presentity's presence information or to the invited parts of the presentity's presence information as per the presence invitation message, they are allowed to be subscribed as per the presence authorization rule.

The content-type of the presence invitation message can be "application/presence-invitation+xml".

The following Table 1 shows an example content of presence invitation message where the presentity "user1@example.com" wants to invite the other persons to subscribe for his/her RPID activities geographical location information (<geopriv/>), since he/she has got a new device with GPS capability.

TABLE 1

Example content of presence invitation message

```
<?xml version="1.0"?>
<presence-invitation      xmlns="urn:presence-invitation"
presence-inviter="user1@example.com">
    <invited-presence-contents-list>
        <geopriv/>
        <activities/>
        <mood/>
    </invited-presence-contents-list>
</ presence-invitation>
```

The following Table 2 shows an example content of presence invitation message where the presentity "user1@example.com" wants to invite the other persons to subscribe for his/her presence information without the hint on the invited parts of the presentity's presence information.

TABLE 2

Example content of presence invitation message
without the hint for the invited parts

```
<?xml version="1.0"?>
<presence-invitation      xmlns="urn:presence-invitation"
presence-inviter="user1@example.com"/>
```

The following Table 3 shows the schema definition for the invitation message.

TABLE 3

Example schema of the content of presence invitation message

```
<?xml version="1.0" encoding="UTF-8"?>
<xs:schema targetNamespace="urn:presence-invitation"
           xmlns="urn:presence-invitation"
           xmlns:xs="http://www.w3.org/2001/XMLSchema"
           elementFormDefault="qualified"
attributeFormDefault="unqualified">
    <xs:element name="presence-invitation">
        <xs:complexType>
            <xs:sequence>
                <xs:element ref="invited-presence-contents-list"
                minOccurs="0"/>
                <xs:any       namespace="##other"
processContents="lax" minOccurs="0" maxOccurs="unbounded"/>
            </xs:sequence>
            <xs:attribute       name="presence-inviter"
type="xs:anyURI" use="required"/>
        </xs:complexType>
    </xs:element>
    <xs:element name="invited-presence-contents-list">
        <xs:complexType>
            <xs:sequence>
                <!-- Sequence of any elements from any namespace
that represents Presence Information and the same could be subscribed for
by the watchers -->
            </xs:sequence>
        </xs:complexType>
    </xs:element>
</xs:schema>
```

Further, the presentity can get the information on the lists of the current watchers by subscribing to the presence watcher information event package as per RFC 3857 "A Watcher Information Event Template-Package for the Session Initiation Protocol (SIP)", J. Rosenberg, August 2004. From the information, the presentity can decide selectively the invitees to receive the presence invitation message. Also, the presentity can add any other invitees of the presence invitation message other than the current watchers. The lists of invitees of the present invitation message as decided by the presentity can be handed over to the presence inviter for sending the present invitation message to those invitees.

Accordingly, while sending the presence invitation message, the lists of the invitees as described above can be included in the body of the presence invitation message so that the presence invitation message can be distributed to those invitees by the network entity called presence invitation distributor. The lists of the invitees within the presence invitation message can be expressed in the URI list formats as per RFC4826 "Extensible Markup Language (XML) Formats for Representing Resource Lists", J. Rosenberg, May 2007.

In addition, the present invention proposes to extend the URI-List with the concept of the <all-watchers> element which is used to describe the lists of all watchers that have presence subscription to the specific presentity. The <all-watchers> element should have presentity attribute which contains the AOR of the presentity and can have watcher-status attribute to specify the target subscription status of the watchers. For example, <all-watchers presentity="sip:presentity@example.com" watcher-status="active"/> means all the watchers of the presentity "sip:presentity@example.com" whose presence subscription status is active.

The following Table 4 shows the example of the URI-List described above.

TABLE 4

Example of the content of URI-List for the list of invitees

<?xml version="1.0" encoding="UTF-8"?>
  <resource-lists xmlns="urn:ietf:params:xml:ns:resource-lists"
          xmlns:ext="urn:all-watcher-ext"
          xmlns:xsi="http://www.w3.org/2001/XMLSchema-instance">
    <list>
      <entry uri="sip:bill@example.com" />
      <entry uri="sip:joe@example.org" />
      <entry uri="sip:ted@example.net" />
      <external         anchor="http://xcap.example.com/resource-lists/users/sip:presentity@example.org/index/~/resource-lists/list[@name="external-list"]"/>
      <ext:all-watchers   presentity="sip:presentity@exmaple.com".   watcher-status="active"/>
    </list>
  </resorce-lists>

The above example shows that the list of the invitees of the presence invitation message include "sip:bill@example.com", "sip:joe@example.com", "sip:ted@example.com", the external URI list residing at resource list server (RLS), and the all active watchers of the presentity "sip:presentity@example.com".

Upon the composition of the presence invitation message and the lists of the invitees to receive the message, the presence inviter sends the presence invitation message, using either SIP REFER or SIP MESSAGE. Though only the methods to use SIP REFER or SIP MESSAGE are described here, it is to be noted that this invention does not preclude to using other kinds of SIP methods other than SIP REFER and SIP MESSAGE.

The methods of SIP REFFER and SIP MESSAGE are described below:

Method 1: Using SIP REFER

In one embodiment of the present invention, the presence inviter uses the SIP REFER request to transmit the presence invitation message to the presence invitation distributor. The body of the SIP REFER request can include the content of the presence invitation message and also can include the list of the invitees as described above.

The SIP REFER request for the presence invitation message can be generated as following:

1. The request-URI of the SIP REFER and the value of "to" header should be set to the SIP address of the presence invitation distributor.

2. The value of the "from" header should be set to the AOR of the presence inviter or the requestor of presence invitation message, who would be the presentity in most cases.

3. The value of the contact header should be set to the SIP address of the device where the presence inviter resides in.

4. The value of the "refer-to" header should describes the referred method, which contain the AOR of the presentity, the SUBSCRIBE method, and the presence event package. With this information the recipient of this SIP request can make the presence subscription to the presentity. Therefore, in most cases, the "refer-to" header should be: Refer-To: sip:presentity@example.com; method=SUBSCRIBE & Event=presence.

5. The value of the "content-type" header should be multipart/mixed, since the body of the SIP REFER request carries two part, of which one part is URI-list which contains the list of presence invitees, as described above, to whom the presence invitation message in this SIP REFER request has to be sent, and the other part is the actual presence invitation message as described above.

6. The new option tag of 'recipient-list-refer' that directs the recipient of the SIP REFER request with URI-list in the body to forward the SIP REFER request to the each member in the list. This new option tag should be specified in the require header as following: Require: recipient-list-refer After constructing the SIP REFER request, as per the above explanation, the presence inviter will send the request to presence invitation distributor, which is responsible for distributing the presence invitation message.

The following Table 5 shows the example of SIP REFER request carrying the presence invitation message:

TABLE 5

Example of the presence invitation message using SIP REFER

```
    REFER sip:presence-invitaiton-distributor.example.com SIP/2.0
    Via:     SIP/2.0/TCP      presence-invitation-generator.example.com;
branch=z9hG4bKhjhs8ass83
    Max-Forwards: 70
    To: <sip:presence-invitaiton-distributor.example.com>
    From: <sip:presentity@example.com>;tag=32331
    Call-ID: d432fa84b4c76e66710
    CSeq: 2 REFER
    Contact: <sip:presence-invitation-generator.example.com>
    Refer-To:              <sip:presentity@example.com;
method=SUBSCRIBE;Event=presence>
    Refer-Sub: false
    Require: recipient-list-refer
Content-Type: multipart/mixed; boundary="50UBfW7LSCVLtggUPe5z"
Content-Length: 362
--50UBfW7LSCVLtggUPe5z
Content-Type : application/resource-lists+xml
Content-Description: The Lists of Presence Invitees
 <?xml version="1.0" encoding="UTF-8"?>
 <resource-lists xmlns="urn:ietf:params:xml:ns:resource-lists"
              xmlns:ext="urn:all-watcher-ext"
              xmlns:xsi="http://www.w3.org/2001/XMLSchema-instance">
        <list>
           <entry uri="sip:bill@example.com" />
           <entry uri="sip:joe@example.org" />
           <entry uri="sip:ted@example.net" />
           <external       anchor="http://xcap.example.com/resource-
lists/users/sip:presentity@example.org/index/
/resource-lists/list[@name="external-list"]"/>
           <ext:all-watchers    presentity="sip:presentity@exmaple.com"    watcher-
status="active"/>
        </list>
      </resource-lists>
   --50UBfW7LSCVLtggUPe5z
         Content-Type : application/presence-invitation+xml
         Cotent-Description: Presence invitaiton message
      <?xml version="1.0"?>
      <presence-invitation          xmlns="urn:presence-invitation"
      presence-inviter="presentity@example.com">
      <invited-presence-contents-list>
                 <geopriv/>
              <activities/>
              <mood/>
      </invited-presence-contents-list>
      </ presence-invitation>
   --50UBfW7LSCVLtggUPe5z
```

According to one embodiment of the present invention, the presence invitation message has been invoked using SIP REFER request containing the list of presence invitees, and the presence invitation message is then can be distributed using the same method of SIP REFER request from the presence invitation distributor to presence invitees through the presence server which subscribe for the invited presence. On receiving from the presence inviter, the SIP REFER request containing the presence invitation message, the presence invitation distributor process it to extract the URI-list part to get to know the list of the presence invitees to each of whom the presence invitation message should be sent. As described above, the extracted URI-list can contain individual member, external URI-list, or <all-watcher> list. The presence invitation distributor can resolve the external URI-list by fetching it from the RLS server, i.e., fetching from the URL specified in the anchor attribute.

Accordingly, if the presence invitation distributor resides within the RLS server, then the external URI-list can be easily resolved without the need of additional fetching as the external URI-list resides in the RLS server. The presence invitation distributor can resolve the <all-watcher> list element from the presence server by subscribing to the presentity's watcher information event package. If the presence invitation distributor resides within the presence server, then the <all-watcher> list element can be resolved without the need for presentity's watcher information event subscription as the presentity's presence server should know about all the list of the watchers and their respective status.

The presence invitation distributor also fetches the content part of the presence invitation message from SIP REFER body, which is the actual message to be sent to the list of the presence invitees. Further, the presence invitation distributor constructs the presence invitation message as per each presence invitee specified in the extracted URI-list and sends it.

The following Table 7 shows the example of the presence invitation message that the presence invitation distributor sends, using SIP REFER, to one of the presence invitees of "sip:bill@example.com" as per the above description. It can be noted that the distributed presence invitation message simply contains the content of the invited presence information.

TABLE 6

Example of the presence invitation message distributed
by the presence invitation distributor using SIP REFER

```
REFER sip:bill@example.com SIP/2.0
    Via:        SIP/2.0/TCP
presence-invitation-distributor.example.com; branch=z9hG4bKhjhs8ass83
    Max-Forwards: 70
    To: <sip:bill@example.com>
    From: <sip:presentity@example.com>;tag=32331
    Call-ID: 38291@presence-invitation-distributor.example.com
    CSeq: 1 REFER
    Contact: <sip:presence-invitation-distributor.example.com>
    Refer-To:       <sip:presentity@example.com;
method=SUBSCRIBE    & Event=presence>
    Refer-Sub: false
        Content-Type : application/presence-invitation+xml
        Cotent-Description: Presence invitaiton message
        Content-Length: ...
<?xml version="1.0"?>
<presence-invitation          xmlns="urn:presence-invitation"
presence-inviter="presentity@example.com">
<invited-presence-contents-list>
        <geopriv/>
        <activities/>
        <mood/>
</invited-presence-contents-list>
</ presence-invitation>
```

Method 2: Using SIP MESSAGE

In another embodiment of the present invention, the presence inviter uses the SIP MESSAGE request to transmit the presence invitation message to the presence invitation distributor. Similar to the above Method-1 using SIP REFER, the SIP MESSAGE request for the presence invitation message can be generated as following:

1. The request-URI of the SIP MESSAGE request and the value of "to" header should be set to the SIP address of the presence invitation distributor.

2. The value of the "from" header should be set to the AOR of the presence inviter or the requestor of presence invitation message, who would be the presentity in most cases.

3. The value of the "contact" header should be set to the SIP address of the device where the presence inviter resides in.

4. The value of the "content-type" header should be multipart/mixed, since the body of the SIP MESSAGE request carries two part, of which one part is the URI-list which contains the list of presence invitees as described above, to whom the presence invitation message in this SIP MESSAGE request has to be sent and another part is the actual presence invitation message as described above.

5. The require header should exist and be set to recipient-list-message as per draft-ietf-sip-uri-list-message "multiple-recipient MESSAGE Requests in the SIP".

After constructing the SIP MESSAGE request as per the above explanation the presence inviter can send the request to presence invitation distributor, which is responsible for distributing the presence invitation message to the invitees.

The following Table 6 shows the example of SIP MESSAGE request carrying the presence invitation message:

TABLE 6

Example of the presence invitation message using SIP MESSAGE

```
MESSAGE sip:presence-invitaiton-distributor.example.com SIP/2.0
    Via:       SIP/2.0/TCP        presence-invitation-generator.example.com;
branch=z9hG4bKhjhs8ass83
    Max-Forwards: 70
    To: <sip:presence-invitaiton-distributor.example.com>
    From: <sip:presentity@example.com>;tag=32331
    Call-ID: d432fa84b4c76e66710
    CSeq: 10 MESSAGE
    Contact: <sip:presence-inviter.example.com>
    Require: recipient-list-message
    Content-Type: multipart/mixed; boundary="50UBfW7LSCVLtggUPe5z"
    Content-Length: ...
        --50UBfW7LSCVLtggUPe5z
        Content-Type : application/resource-lists+xml
    Content-Description: The Lists of Presence Invitees
<?xml version="1.0" encoding="UTF-8"?>
<resource-lists xmlns="urn:ietf:params:xml:ns:resource-lists"
        xmlns:ext="urn:all-watcher-ext"
        xmlns:xsi="http://www.w3.org/2001/XMLSchema-instance">
    <list>
        <entry uri="sip:bill@example.com" />
        <entry uri="sip:joe@example.org" />
        <entry uri="sip:ted@example.net" />
        <external          anchor="http://xcap.example.com/resource-
lists/users/sip:presentity@example.org/index/~
/resource-lists/list[@name="external-list"]"/>
        <ext:all-watchers    presentity="sip:presentity@exmaple.com"          watcher-
status="active"/>
    </list>
</resource-lists>
--50UBfW7LSCVLtggUPe5z
        Content-Type : application/presence-invitation+xml
        Cotent-Description: Presence invitaiton message
<?xml version="1.0"?>
<presence-invitation             xmlns="urn:presence-invitation"
presence-inviter="presentity@example.com">
```

TABLE 6-continued

Example of the presence invitation message using SIP MESSAGE

```
<invited-presence-contents-list>
        <geopriv/>
    <activities/>
    <mood/>
</invited-presence-contents-list>
</ presence-invitation>
--50UBfW7LSCVLtggUPe5z
```

Further, the presence invitation message composed by the presence inviter as per presentity's transmits to the network for its distribution to the designated presence Invitees using SIP REFER or SIP MESSAGE as used while transmitting the presence invitation message from presence inviter to presence invitation distributor. The presence invitation distributor, upon receiving the presence invitation message, would extract the list of the presence invitees from the received presence invitation message and then distributes the presence invitation message to them. It is also appreciated that the presence invitation distributor can be able to be embedded within the presence server or resource list server (RLS). Further, there can be a new network entity to implement the presence invitation distributor. Depending upon the method used, which is either SIP REFER or SIP MESSAGE, the presence invitation distributor processes the received request and distributes the presence invitation message to the intended list of the presence invitees as specified within the presence invitation message. The following description describes the method for presence invitation distributor's processing the received request and taking an appropriate action.

According to another embodiment of the present invention, SIP MESSAGE method is used for transmitting presence invitation message from presence inviter to presence invitees through presence invitation distributor. The processing of the received SIP MESSAGE for presence invitation message is basically same as for SIP REFER method, i.e. the presence invitation distributor extract and resolve the list of presence invitees from the received presence invitation message, then distribute the presence invitation message to each of them.

The following Table 7 shows the example of the presence invitation message that the presence invitation distributor sends, using SIP MESSAGE, to one of the presence invitees of sip:bill@example.com as per the above description. It can be noted that the distributed presence invitation message contains the content of the invited presence information.

TABLE 7

Example of the presence invitation message distributed by
the Presence Invitation Distributor using SIP MESSAGE

```
    MESSAGE sip:bill@example.com SIP/2.0
   Via:       SIP/2.0/TCP
presence-invitation-distributor.example.com; branch=z9hG4bKhjhs8ass83
    Max-Forwards: 70
    To: <sip:bill@example.com>
    From: <sip:presentity@example.com>;tag=32331
    Call-ID: 38291@presence-invitation-distributor.example.com
    CSeq: 1 MESSAGE
    Contact: <sip:presence-invitation-distributor.example.com>
        Content-Type : application/presence-invitation+xml
    Cotent-Description: Presence invitaiton message
    Content-Length: ...
<?xml version="1.0"?>
<presence-invitation        xmlns="urn:presence-invitation"
presence-inviter="presentity@example.com">
<invited-presence-contents-list>
```

TABLE 7-continued

Example of the presence invitation message distributed by
the Presence Invitation Distributor using SIP MESSAGE

```
        <geopriv/>
        <activities/>
        <mood/>
</invited-presence-contents-list>
</ presence-invitation>
```

Accordingly, in the present invention, the presence invitee who receives the presence invitation message from the presence inviter though the presence invitation distributor, upon the receipt of invitation message, can elect to subscribe to the presence inviter's presence information depending on his/her interest or just ignore it. The presence invitee can be the current active watcher of the presence inviter or not. If the presence invitee has not yet subscribed for the presence inviter's presence information, then be/she may elect to make subscription for the presence inviter's presence information as per the presence invitation message. If the presence invitee is currently an active watcher and finds that he/she has been invited for the parts of the presence inviter's presence information for which he/she has not been aware of it, then he/she can elect to re-subscribe to the presence inviter's presence information for the newly invited parts of the presence inviter's presence information as per the presence invitation message.

The presence invitation message is totally informational to the presence invitees and it wholly depends on the presence invitees whether to make subscription to the presence inviter's presence information as per the presence invitation message or not. When generating the presence subscription, the presence invitee can follow the existing arts.

Figure 3:
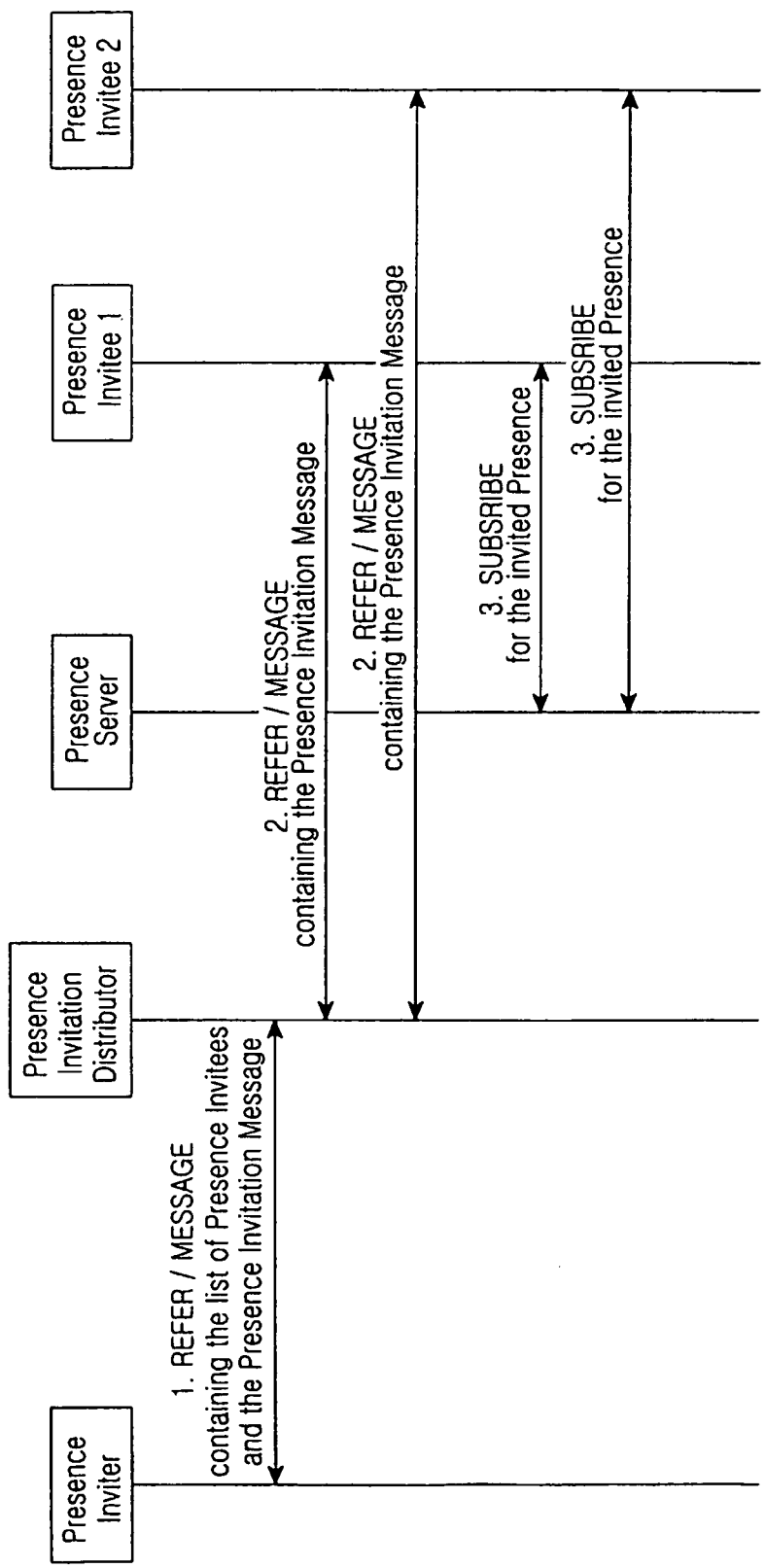
FIG. 3 is a signal flow diagram illustrating an exemplary overall flow for the dynamic advertisement of presence information.

FIG. 3 is a signal flow diagram illustrating an exemplary overall flow for the dynamic advertisement of presence information using SIP REFER or SIP MESSAGE method, in accordance with embodiments of the present invention, the presence invitation message from the presence inviter being distributed to each presence invitees by presence invitation distributor.

Accordingly, the presence inviter, who is tightly coupled with the presentity, initiates the presence invitation message using either SIP REFER or SIP MESSAGE request. Further, the presence invitation distributor distributes out the presence invitation message to each presence invitee as requested by the presence inviter. Upon receiving the presence invitation message, each presence invitee can elect to make subscription or re-subscription to the presence inviter's presence information. Also, it can be noted that if the presence invitation message has used SIP REFER, then the same method should also be used for its distribution and the same applies for the case using SIP MESSAGE.

Figure 4:
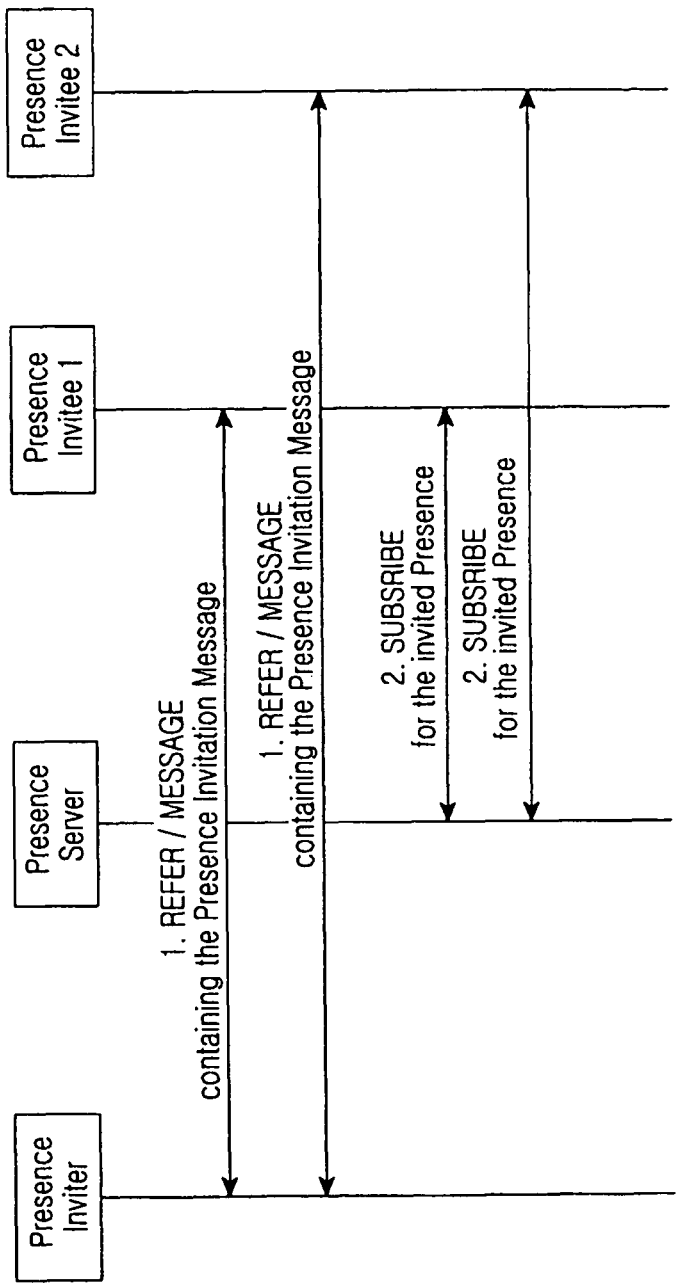
FIG. 4 is the signal flow diagram illustrating an exemplary flow for advertising the presence information directly to the presence invitees without presence invitation distribution unit.

FIG. 4 is the signal flow diagram illustrating the advertisement of the presence information directly to the presence invitees without presence invitation distribution unit. In accordance with this embodiment of the present invention, an alternate method that the presence inviter can be able to send the presence invitation message directly to the designated presence invitees without the need to going through the presence invitation distributor for its distribution is described. It is appreciated that the similar methods of using either SIP REFER or SIP MESSAGE, containing the presence invitation message as described above, can be used for the delivery of the presence invitation message with the following clarifications. The subscription by the presence invitees can be achieved through presence server.

In one exemplary aspect, the presence invitee is considered to be a single person. Therefore, the content of the presence invitation message can include only the invitation itself and there is no need to include the lists of the presence invitees. The presence inviter sends such presence invitation message using the SIP REFER or SIP MESSAGE as described above with the following clarifications:

In one aspect, when using SIP REFER,

1. The request-URI of the SIP REFER and the value of "to" header should be set to the AOR of the target presence invitee.

2. The body of the SIP REFER request carries only the content of the presence invitation message and does not include the URI-List content. Thus, the value of the "content-type" should be application/presence-invitation+xml.

3. As this is a request to single person, there is no need to have the option tag of 'recipient-list-refer' in the require header.

In another aspect, when using SIP MESSAGE,

1. The request-URI of the SIP MESSAGE and the value of "to" header should be set to the AOR of the target presence invitee.

2. The body of the SIP MESSAGE request carries only the content of the presence invitation message and does not include the URI-list content. Thus, the value of the "content-type" should be application/presence-invitation+xml.

3. As this is a request to single person, there is no need to have the option tag of recipient-list-message in the require header.

Upon receiving the presence invitation message directly from the presence inviter, the presence invitee can behave in the same way as above by subscribing to the information depending on his/her interest.

The examples of the presence invitation message as per the alternate method, using either SIP REFER or SIP MESSAGE would be as followings:

TABLE 8

Example of presence invitation message sent directly
to the single presence invitee using SIP REFER.

REFER sip:single-presence-invitee@example.com SIP/2.0
    Via:        SIP/2.0/TCP
presence-invitation-generator.example.com; branch=z9hG4bKhjhs8ass83
    Max-Forwards: 70
    To: <sip:single-presence-invitee@example.com >
    From: <sip:presentity@example.com>;tag=32331
    Call-ID: d432fa84b4c76e66710
    CSeq: 2 REFER
    Contact: <sip:presence-inviter.example.com>
    Refer-To:     <sip:presentity@example.com;
method=SUBSCRIBE    & Event=presence>
    Refer-Sub: false
        Content-Type : application/presence-invitation+xml
        Cotent-Description: Presence invitaiton message
        Content-Length: ...
<?xml version="1.0"?>

TABLE 8-continued

Example of presence invitation message sent directly
to the single presence invitee using SIP REFER.

<presence-invitation        xmlns="urn:presence-invitation"
presence-inviter="presentity@example.com">
</ presence-invitation>

TABLE 9

Example of presence invitation message sent directly
to the single presence invitee using SIP MESSAGE.

MESSAGE sip:single-presence-invitee@example.com SIP/2.0
    Via:        SIP/2.0/TCP
presence-invitation-generator.example.com; branch=z9hG4bKhjhs8ass83
    Max-Forwards: 70
    To: <sip:single-presence-invitee@example.com >
    From: <sip:presentity@example.com>;tag=32331
    Call-ID: d432fa84b4c76e66710
    CSeq: 10 MESSAGE
    Contact: <sip:presence-inviter.example.com>
        Content-Type : application/presence-invitation+xml
        Cotent-Description: Presence invitaiton message
        Content-Length: ...
<?xml version="1.0"?>
<presence-invitation        xmlns=:"urn:presence-invitation"
presence-inviter="presentity@example.com">
</ presence-invitation>

Figure 5:
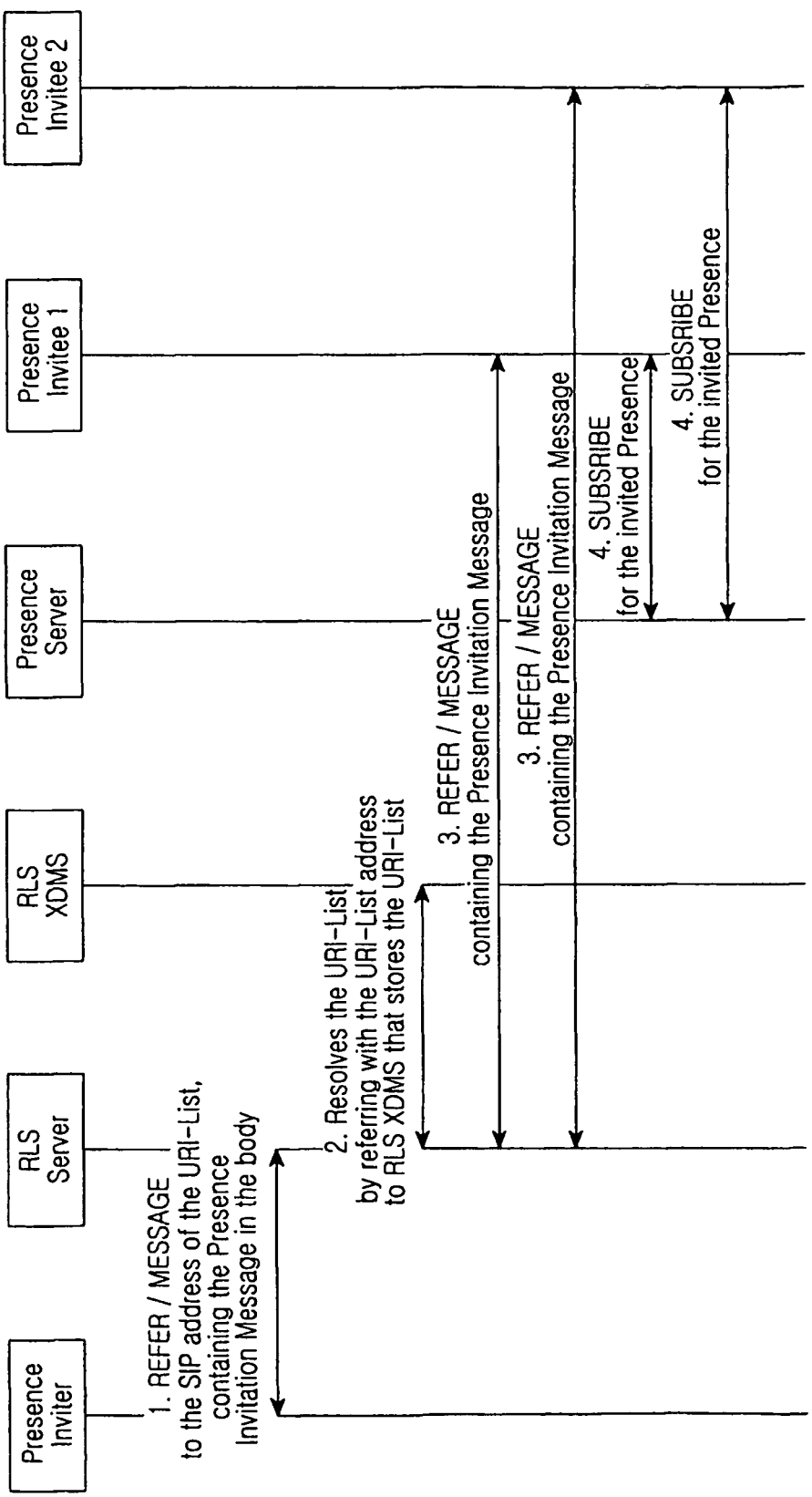
FIG. 5 is the signal flow diagram illustrating an exemplary flow of the presence invitation message directly sent to the RLS server with the pre-established URI-list address.

FIG. 5 is a signal flow diagram illustrating the dynamic advertisement of presence information in which the presence invitation message is sent to the RLS server with the SIP address of the pre-established URI-list as per the alternate method as described above. In accordance with the embodiment of the present invention, dissemination of the presence invitation message to multiple presence invitees in URI-list through RLS server can be achieved.

Accordingly, a URI-list can be either ad-hoc or pre-established one. The ad-hoc URI-list is the one that a user generates in ad-hoc manner within a SIP message request. So, the ad-hoc URI-list is ephemeral in that the list is meaningful only during the SIP session generated by the SIP message request and disappears when the SIP session is terminated. On the contrary, the pre-established URI-List is static; a user creates and stores the URI-list in the RLS XDMS (resource list XML document management server, OMA XDM enabler). This pre-established URI-List is assigned with an SIP address such that a user can easily address the pre-established URI-List using this SIP address.

As described earlier, the presence inviter specify all the URI-List, either ad-hoc or pre-established, for multiple presence invitees within the presence invitation message in the URI-list format as per RFC4826 and send it to the presence invitation distributor. Further, the presence invitation distributor can resolve the URI-list within the presence invitation message to each members of the presence invitee and distribute the presence invitation message to each of them.

The approach described might not be good to utilize the advantage of easily addressing the pre-established URI-list using its SIP address, because even the pre-established URI-list should be specified within the presence invitation message. In order to overcome with the disadvantages in this situation, the present invention proposes an another alternate method that, when the multiple presence invitees are expressed in the pre-established URI-list, the presence inviter be able to send the presence invitation message directly to the SIP address of the pre-established URI-list. Further, the presence invitation message would be forwarded to the RLS server for the resolution of the pre-established URI-list by referring to the RLS XDMS that stores the pre-established URI-list. After the completion of resolution of the URI-list the RLS server would take the responsibility of the presence invitation distributor for the distribution of the presence invitation message to each resolved members of the presence invitees in the pre-established URI-list.

Therefore, in the situation of using the pre-established URI-list to represent multiple presence lists, the content of the presence invitation message include only the invitation itself and there is no need to include the URI-List of the presence invitees as described above.

The presence inviter sends such presence invitation message using the SIP REFER or SIP MESSAGE as described above with the following clarifications:

In one aspect, when using SIP REFER,

1. The request-URI of the SIP REFER and the value of "to" header should be set to the SIP address of the pre-established URI-List.

2. The body of the SIP REFER request carries only the content of the presence invitation message and does not include the URI-list content. Thus, the value of the "content-type" should be application/presence-invitation+xml.

3. There is no need to have the option tag of recipient-list-refer in the require header.

In another aspect, when using SIP MESSAGE,

1. The request-URI of the SIP MESSAGE and the value of "to" header should be set to the SIP address of the pre-established URI-list.

2. The body of the SIP MESSAGE request carries only the content of the presence invitation message and does not include the URI-List content. Thus, the value of the "content-type" should be application/presence-invitation+xml.

3. There is no need to have the option tag of recipient-list-message in the require header.

Upon receiving the presence invitation message from the RLS server, the presence invitee can behave in the same way as described above by subscribing depending upon his/her interest.

The following example shows the presence invitation message as per the above mentioned alternate method, using either SIP REFER or SIP MESSAGE, to the pre-established URI-List as described here.

TABLE 10

Example presence invitation message directly sent to the RLS server with the pre-established URI-List address using SIP REFER.

REFER sip:preestablished-URI-List@example.com SIP/2.0
Via: SIP/2.0/TCP presence-inviter.example.com; branch=z9hG4bKhjhs8ass83
Max-Forwards: 70
To: <sip:preestablished-URI-List@example.com>
From: <sip:presentity@example.com>;tag=32331
Call-ID: d432fa84b4c76e66710
CSeq: 2 REFER TABLE 10-continued Example presence invitation message directly sent to the RLS server with the pre-established URI-List address using SIP REFER.

Contact: <sip:presence-inviter.example.com>
Refer-To:     <sip:presentity@example.com; method=SUBSCRIBE    & Event=presence>
Refer-Sub: false
    Content-Type : application/presence-invitation+xml
    Cotent-Description: Presence invitaiton message
    Content-Length: ...
<?xml version="1.0"?>
<presence-invitation    xmlns="urn:presence-invitation" presence-inviter="presentity@example.com">
</ presence-invitation>

TABLE 11

Example presence invitation message directly sent to the RLS erver with the pre-established URI-list address, using SIP MESSAGE.

MESSAGE sip:preestablished-URI-List@example.com SIP/2.0
Via: SIP/2.0/TCP presence-invitation-generator.example.com; branch=z9hG4bKhjhs8ass83
Max-Forwards: 70
To: <sip:preestablished-URI-List@example.com>
From: <sip:presentity@example.com>;tag=32331
Call-ID: d432fa84b4c76e66710
CSeq: 10 MESSAGE
Contact: <sip:presence-inviter.example.com>
    Content-Type : application/presence-invitation+xml
    Cotent-Description: Presence invitaiton message
    Content-Length: ...
<?xml version="1.0"?>
<presence-invitation    xmlns="urn:presence-invitation" presence-inviter="presentity@example.com">
</ presence-invitation>

As per the above example, Firstly, the presence invitation message which is invoked by the presence inviter can be forwarded to the RLS server. Further, the RLS server resolves the URI-List of sip:preestablished-URI-List@example.com by referencing to the RLS XDMS that stores this URI-list, and then the RLS server distributes the received presence invitation message to each member in the resolved URI-list.

Although the present invention has been fully described in connection with the preferred embodiments thereof with reference to the accompanying drawing, it is to be noted that various changes and modifications are possible and are apparent to those skilled in the art. Such changes and modifications are to be understood as included within the scope of the present invention as defined by the appended claims unless they depart there from.

Glossary of Terms and their Definitions:
SIP: Session Initiation Protocol
AOR: Address of Record
RSL: Resource List Server
XDMS: XML Document Management Server
OMA: Open Mobile Alliance

The invention claimed is:

1. A method for informing watcher clients about newly available parts or any new updates made to presence information in a presentity client device, the method comprising:

generating, by the presentity client device, an invitation request message for requesting subscription to a newly available presence information of the presentity client device, the invitation request message including a list of watcher clients to be invited and content of newly available presence information; and transmitting, by the presentity client device, the invitation request message to a server which distributes the newly available presence information to the watcher clients.

2. The method of claim 1, wherein the watcher clients are current active watchers or potential watchers who have yet to subscribe to the presence information.

3. The method of claim 1, wherein the invitation request message is transmitted by a Session Initiation Protocol (SIP) REFER or a SIP MESSAGE.

4. The method of claim 3, wherein the newly available presence information is distributed to the watcher clients by the SIP REFER or the SIP MESSAGE.

5. The method of claim 1, wherein the invitation request message further includes an Address Of Record (AOR) of the presentity client device transmitting the invitation request message so that the watcher clients who receive the newly available presence information can subscribe to the presence information.

6. The method of claim 1, wherein the list of watcher clients is included in a Uniform Resource Identifier (URI)-list extracted from the invitation request message by the server, before distributing the newly available presence information.

7. The method of claim 6, wherein the URI-list contains at least one of an individual member, an external URI-list and an all-watchers list, wherein the all-watchers list lists all watcher clients who have subscribed to presence information of the presentity client device.

8. The method of claim 7, wherein the external URI-list is determined by fetching the URI-list from a Resource List Server (RLS) server and the all-watcher list is determined by subscribing to an event package of the client's watcher information of the presentity client device.

9. The method of claim 1, wherein if the invitation request message does not include the list of watcher clients, the invitation request message is sent directly to a predetermined watcher clients and is not sent through the server.

10. A method for requesting that watchers should subscribe to newly available parts or any new updates made to presence information in a server device, the method comprising:
   receiving, by the server device, an invitation request message for requesting subscription to a newly available presence information of a presentity client from the presentity client, the invitation request message including a list of watcher clients to be invited and the newly available presence information;
   determining, by the server device, at least one watcher client by identifying the list of watcher clients to be invited;
   acquiring, by the server device, the newly available presence information from the invitation request message; and
   distributing, by the server device, the newly available presence information to the determined watcher client.

11. The method of claim 10, further comprising updating the newly available presence information in a presence server, wherein the presence server provides a presence information updated by subscription request of the determined watcher client.

12. The method of claim 10, wherein the determined watcher client is a current active watcher or a potential watchers who have yet to subscribe to the presence information.

13. The method of claim 10, wherein the invitation request message is transmitted by a Session Initiation Protocol (SIP) REFER or a SIP MESSAGE.

14. The method of claim 13, wherein the newly available presence information is distributed to the determined watcher client by the SIP REFER or the SIP MESSAGE.

15. The method of claim 10, wherein the invitation request message further includes an Address Of Record (AOR) of the presentity transmitting the invitation request message so that the watcher client who receives the newly available presence information can subscribe to the presence information.

16. The method of claim 10, wherein the list of watcher clients is included in a Uniform Resource Identifier (URI)-list extracted from the invitation request message, before distributing the newly available presence information.

17. A method for requesting that watcher clients subscribe to newly available parts or any new updates made to presence information in a Resource List Server (RLS) device, the method comprising:
   receiving, by the RLS device, an invitation request message for requesting subscription to a newly available presence information of a presentity client from the presentity client, the invitation request message including a content of the newly available presence information;
   determining, by the RLS device, at least one watcher client by referencing a Resource List XML Document Management Server (RL XDMS) that stores a predetermined Uniform Resource Identifier (URI)-list; and
   distributing, by the RLS device, the content of the newly available presence information to the determined at least one watcher client.

18. The method of claim 17, wherein the invitation request message is received by the RLS device via a Session Initiation Protocol (SIP) address of the URI-list.

19. The method of claim 17, wherein the distributing step further comprises distributing the content of the newly available presence information to at least one watcher client of the predetermined URI-list.

20. The method of claim 17, wherein the invitation request message is received using Session Initiation Protocol (SIP) REFER or a SIP MESSAGE, and the content of the newly available presence information is distributed by the SIP REFER or the SIP MESSAGE.

* * * * *